US012804673B2

(12) United States Patent
Liu et al.

(10) Patent No.: US 12,804,673 B2
(45) Date of Patent: Nov. 17, 2026

(54) SYSTEMS, METHODS, AND NON-TRANSITORY COMPUTER READABLE MEDIA FOR VIRTUAL CARRIERS BASED WIRELESS COMMUNICATIONS

(71) Applicant: ZTE Corporation, Shenzhen (CN)

(72) Inventors: Xing Liu, Shenzhen (CN); Xianghui Han, Shenzhen (CN); Jing Shi, Shenzhen (CN); Kai Xiao, Shenzhen (CN); Jian Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 295 days.

(21) Appl. No.: 18/768,717

(22) Filed: Jul. 10, 2024

(65) Prior Publication Data

US 2024/0365336 A1 Oct. 31, 2024

Related U.S. Application Data

(63) Continuation of application No. PCT/CN2022/109483, filed on Aug. 1, 2022.

(51) Int. Cl.
*H04W 72/231* (2023.01)
*H04W 72/0446* (2023.01)
(Continued)

(52) U.S. Cl.
CPC ..... *H04W 72/231* (2023.01); *H04W 72/0446* (2013.01); *H04W 72/0453* (2013.01); *H04W 72/0457* (2023.01); *H04W 74/0833* (2013.01)

(58) Field of Classification Search
CPC ........... H04W 72/231; H04W 72/0446; H04W 72/0453; H04W 72/0457; H04W 72/0833;
(Continued)

(56) References Cited

U.S. PATENT DOCUMENTS

2010/0080308 A1 4/2010 Yin et al.
2015/0098412 A1 4/2015 Yerramalli et al.
(Continued)

FOREIGN PATENT DOCUMENTS

CN 104838613 A 8/2015
CN 106060943 A 10/2016
CN 108024265 A 5/2018

OTHER PUBLICATIONS

Extended European Search Report for EP Appl. No. 22953442.5, dated Aug. 18, 2025 (10 pages).
(Continued)

*Primary Examiner* — Farid Seyedvosoghi
(74) *Attorney, Agent, or Firm* — Foley & Lardner LLP

(57) ABSTRACT

Arrangements disclosed herein relate to data communicating using virtual carriers, including receiving, by a User Equipment (UE) from a network, first information for a first virtual carrier. The UE determines the second information for a second virtual carrier based on the first information. The UE sends to the network uplink access signal on an uplink resource of the first virtual carrier or the second virtual carrier in some examples. In some examples, the UE receives from the network downlink control information on at least one of a first downlink resource in the first virtual carrier or a second downlink resource in the second virtual carrier based on the first information and the second information.

20 Claims, 13 Drawing Sheets

(51) Int. Cl.

| | |
|---|---|
| ***H04W 72/0453*** | (2023.01) |
| ***H04W 72/0457*** | (2023.01) |
| ***H04W 74/0833*** | (2024.01) |

(58) Field of Classification Search

CPC ... H04L 5/0044; H04L 5/0094; H04L 5/0053; H04L 5/001

See application file for complete search history.

(56) References Cited

U.S. PATENT DOCUMENTS

| | | | | |
|---|---|---|---|---|
| 2015/0327239 | A1* | 11/2015 | Webb | H04L 5/0007 370/330 |
| 2021/0084653 | A1* | 3/2021 | Li | H04L 5/001 |

OTHER PUBLICATIONS

International Search Report and Written Opinion on International Patent Appl. No. PCT/CN2022/109483, mailed Dec. 20, 2022 (7 pages).

* cited by examiner

1000

| Parameter | Definition |
|---|---|
| preambleReceivedTargetPower | INTEGER (-202..-60) |
| preambleTransMax | ENUMERATED {n3, n4, n5, n6, n7, n8, n10, n20, n50, n100, n200} |
| powerRampingStep | ENUMERATED {dB0, dB2, dB4, dB6} |

FIG. 10

1100

| Preamble | Power |
|---|---|
| First Transmission | $P_0$ |
| Second Transmission (first reattempt) | $P_0 + \Delta$ |
| Third Transmission (second reattempt) | $P_0 + 2\Delta$ |
| ... | ... |
| (N+1)st Transmission (Nst reattempt) | $P_0 + N \times \Delta$ |

FIG. 11

1200

| Preamble | Virtual Carrier | Power |
| --- | --- | --- |
| Initial transmission | 1 | $P_{0,vc(1)}$ |
| Second transmission (first reattempt) | 2 | $P_{0,vc(2)} + \Delta_{vc(2)}$ |
| Third transmission (second reattempt) | 1 | $P_{0,vc(1)} + 2\Delta_{vc(1)}$ |
| … | | … |
| (N+1)[st] transmission (N[st] reattempt) | x | $P_{0,vc(x)} + N \times \Delta_{vc(x)}$ |

FIG. 12

| | RO1 | RO2 | RO3 | RO4 |
|---|---|---|---|---|
| SSB#0 | v | | | |
| SSB#1 | | v | | |
| SSB#3 | | | v | |

1600

| | RO1 | RO2 | RO3 | RO4 | RO5 | RO6 | RO7 | RO8 |
|---|---|---|---|---|---|---|---|---|
| SSB#0 | V | | | - | V | | | - |
| SSB#1 | | V | | | | V | | |
| SSB#3 | | | V | | | | V | |

FIG. 16

1700

| | RO1 | RO2 | RO3 | RO4 | RO5 | RO6 | RO7 | RO8 |
|---|---|---|---|---|---|---|---|---|
| SSB#0 | V | | | V | | | - | - |
| SSB#1 | | V | | | V | | | |
| SSB#3 | | | V | | | V | | |

FIG. 17

SYSTEMS, METHODS, AND NON-TRANSITORY COMPUTER READABLE MEDIA FOR VIRTUAL CARRIERS BASED WIRELESS COMMUNICATIONS

CROSS-REFERENCE TO RELATED APPLICATION

This application claims the benefit of priority under 35 U.S.C. § 120 as a continuation of International Patent Application No. PCT/CN2022/109483, filed on Aug. 1, 2022, the disclosure of which is incorporated herein by reference in its entirety.

TECHNICAL FIELD

The disclosure relates generally to wireless communications and, more particularly, to systems, methods, and non-transitory computer-readable media for signal and channel transmission.

BACKGROUND

Although wireless communication services cover increasingly more applications, conventional wireless communication services do not align with communication frequency bands. For some systems, frequency bands are high relative to the service, resulting in greater loss in propagation. The cell coverage radius is relatively small under the same power.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

Some arrangements of the present disclosure relate to systems, apparatuses, methods, and non-transitory computer-readable media for communicating data, including receiving, by a User Equipment (UE) from a network (e.g., a Base Station (BS)), first information for a first virtual carrier. The UE determines the second information for a second virtual carrier based on the first information. The UE sends to the network uplink access signal on an uplink resource of the first virtual carrier or the second virtual carrier in some examples. In some examples, the UE receives from the network downlink control information on at least one of a first downlink resource in the first virtual carrier or a second downlink resource in the second virtual carrier based on the first information and the second information.

Some arrangements of the present disclosure relate to systems, apparatuses, methods, and non-transitory computer-readable media for communicating data, including sending to the UE first information for a first virtual carrier. Second information for a second virtual carrier can be determined by the UE based on the first information. In some examples, the network receives from the UE uplink access signal on an uplink resource of the first virtual carrier or the second virtual carrier. In some examples, the network sends to the UE downlink control information on at least one of a first downlink resource in the first virtual carrier or a second downlink resource in the second virtual carrier based on the first information and the second information.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 10 is a table illustrating example definitions of transmission power parameters, according to some arrangements.

FIG. 11 is a table illustrating an example relationship between transmission attempts of the preamble of the PRACH and the transmission power, according to some arrangements.

FIG. 12 is a table illustrating an example relationship between transmission attempts of the preamble of the PRACH and the transmission power, according to some arrangements.

FIG. 16 is a table illustrating an example association between transmitted SSBs and ROs, according to some arrangements.

FIG. 17 is a table illustrating an example association between transmitted SSBs and ROs, according to some arrangements.

DETAILED DESCRIPTION

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Mobile communication systems can be systematically networked on carrier frequencies higher than those used in 2G, 3G, and 4G systems. Some systems utilize frequency bands of 3 GHz to 6 GHz, 6 GHz to 100 GHz, and so on. In these systems, frequency bands are high relative to the service, resulting in greater loss in propagation. The cell coverage radius is relatively small under the same power. To implement broader range of communication systems, including but not limited to 2G, 3G, and 4G, some arrangements herein relate to enhancing coverage and implementing multiple beams for initial access procedures.

Figure 1:
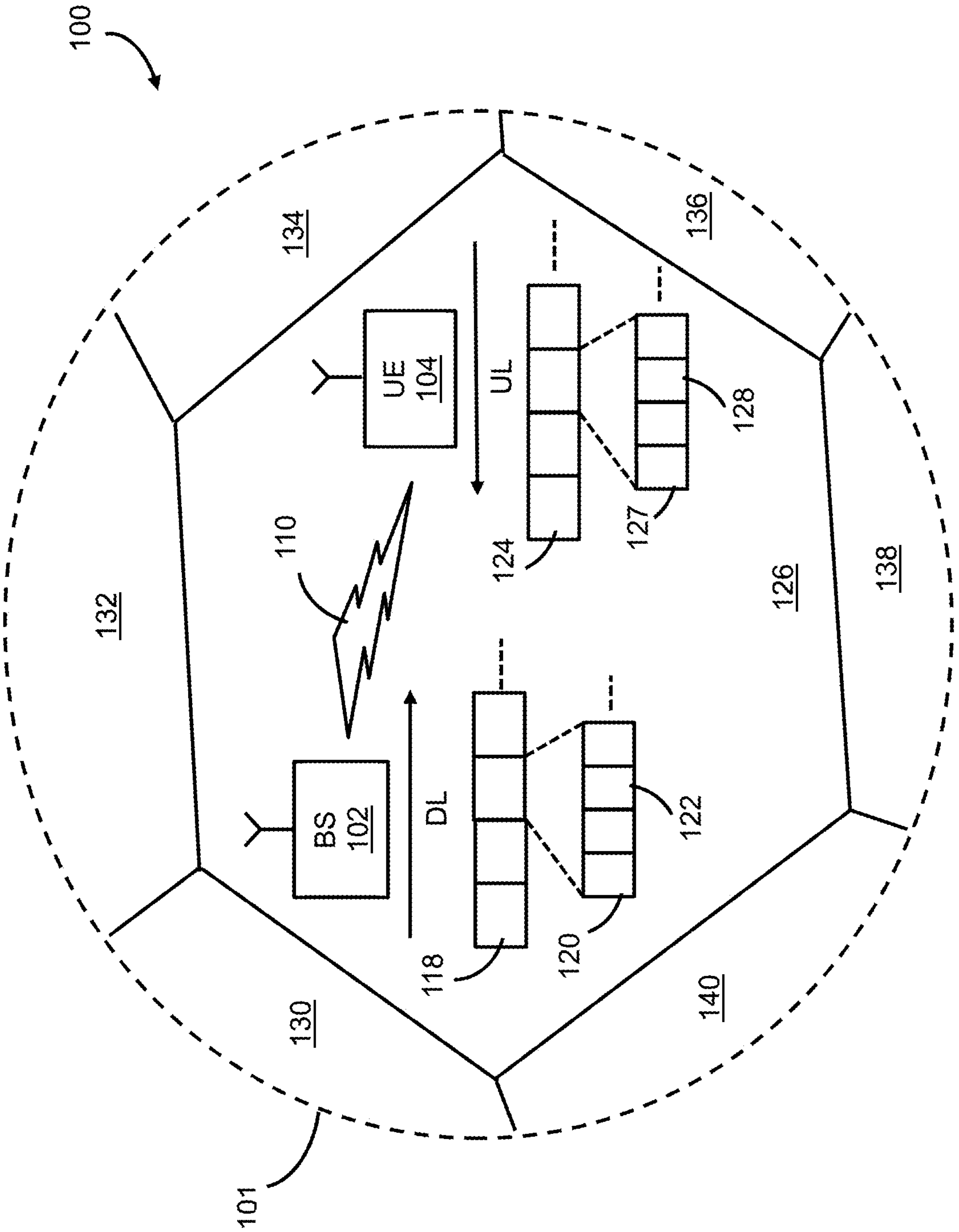
FIG. 1 illustrates an example cellular communication network, according to some arrangements.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as network 100. Such an example network 100 includes a BS 102 and a UE 104 that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one BS operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
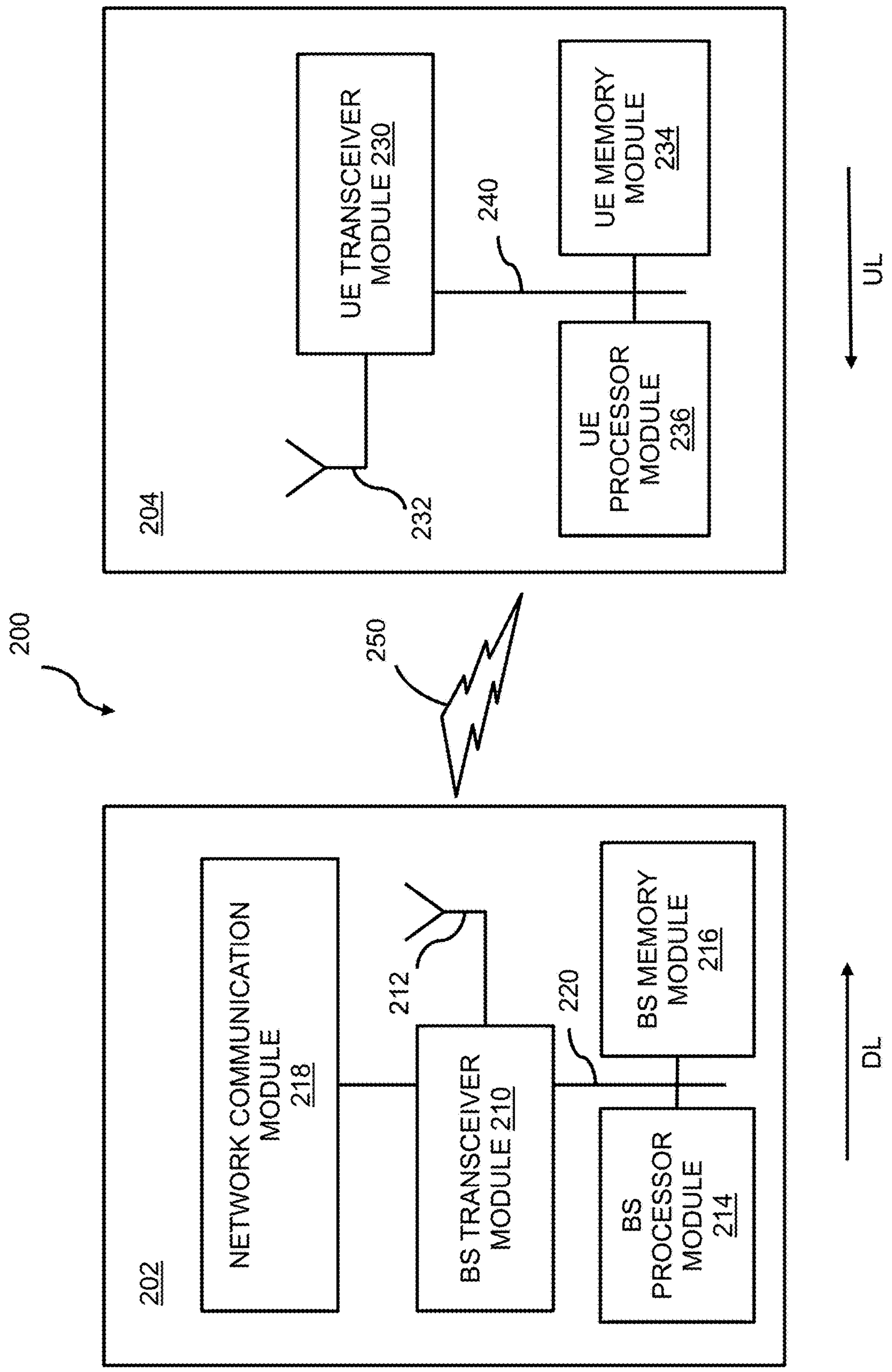
FIG. 2 illustrates block diagrams of an example base station and an example user equipment device, according to some arrangements.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a BS 202 (hereinafter "BS 202") and a user equipment device 204 (hereinafter "UE 204"). The BS 202 includes a Base Station (BS) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an uplink transceiver 230 that includes a radio frequency (RF) transmitter and a RF receiver each including circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each including circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the BS transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the BS transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the BS transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 can be various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be implemented directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the BS 202 that enable bi-directional communication between BS transceiver 210 and other network components and communication nodes configured to communication with the BS 202. For example, network communication module 218 may be configured to support internet or WiMAX traffic. In a typical deployment, without limitation, network communication module 218 provides an 802.3 Ethernet interface such that BS transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

In an initial access procedure, a terminal e.g., a User Equipment (UE) attempts to detect a Synchronization Signal/Physical Broadcast Channel (PBCH) Block (SSB) on some predefined frequency point. The frequency point, which can be referred to as sync raster, can be used to detect Primary Synchronization Signal (PSS), Secondary Synchronization Signal (SSS) and receive PBCH. In some implementations, multiple SSBs in a time domain are defined within one transmission period. For example, a maximum number of SSBs within one period is $L_{max}=4$ or 8 for FR1. In some examples, a maximum number of SSBs within one period is $L_{max}=64$ for FR2. In some implementations, each SSB occupies 4 OFDM symbols in the time domain and 240 subcarriers in the frequency domain. In some implementations, one SSB includes a PSS, an SSS, and a PBCH. In some implementations, the SSB index is indicated by PBCH Demodulation Reference Signal (DMRS) for FR1. In some implementations, the SSB index is indicated by PBCH DMRS and PBCH payload for FR2.

Figure 3:
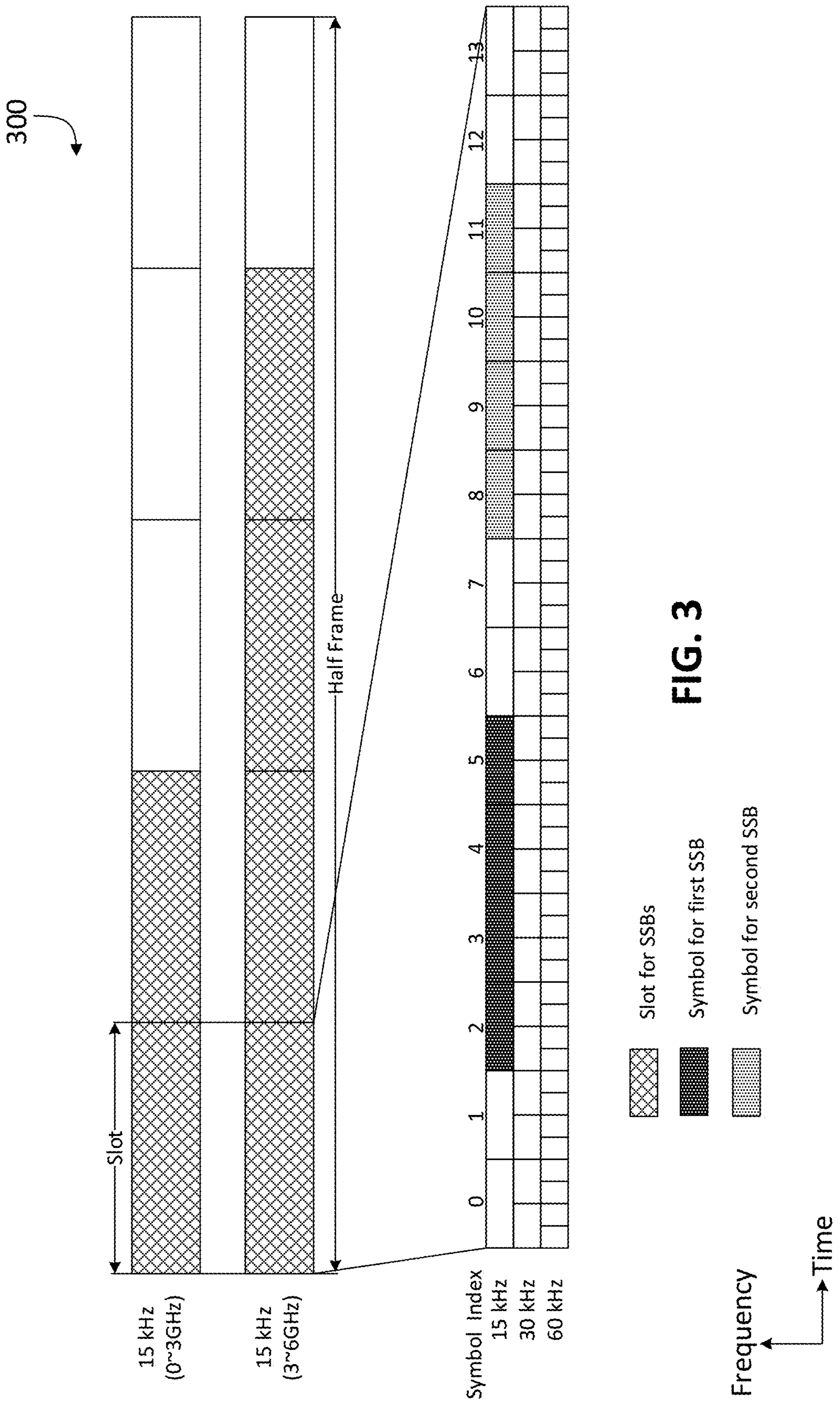
FIG. 3 is a diagram illustrating an example mapping relationship between SSBs and slots.
Figure 4:
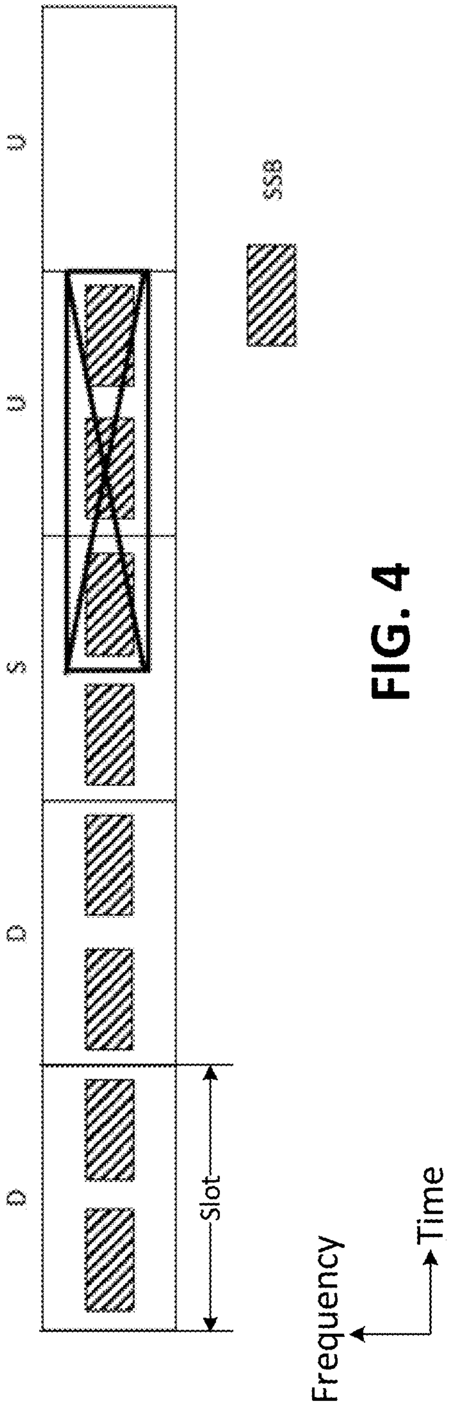
FIG. 4 which is a diagram illustrating inability to transmit SSBs in slots.

Regarding different Sub-Carrier Spacing (SCS), different mapping relationships from SSBs to slots can be defined. FIG. 3 is a diagram illustrating an example mapping relationship 300 between SSBs and slots, according to some arrangements. The vertical dimension corresponds to the frequency domain, and the horizontal dimension corresponds to the time domain. The mapping relationship 300 corresponds to 15 kHz SCS SSB. For frequency range e.g., 0-3 GHZ, four time-domain positions are defined. The time-domain positions occupy the first two slots of a half frame, which contains 5 slots total. There are two SSBs in each slot. The starting symbol of these two SSBs are symbol #2 and symbol #8, respectively. For frequency range e.g., 3-6 GHz, eight time-domain positions are defined. These time-domain positions occupy the first four slots of a half frame. There are two SSBs in each slot. The starting symbol of these two SSBs are symbol #2 and symbol #8, respectively. In the example in which a TDD carrier is configured with frame structure "DDSUU," the SSBs located in the fourth slot cannot be transmitted to the UE as the fourth slot is an uplink slot. As used herein, "D" refers to a downlink slot, "U" refers to an uplink slot, and "S" represents a flexible or special slot. The flexible or special slot can be further rewritten by dynamic signaling into a downlink resource or an uplink resource or a dynamic flexible resource. Whether the SSBs located in the third special slot can be transmitted depends on symbol attribute. In the example in which the third slot has symbols that are configured as "DDDFFFF UUUUUUU," the second SSB also cannot be transmitted. As shown in FIG. 4 which is a diagram illustrating inability to transmit SSBs in slots, only the first five SSBs can be transmitted under this frame structure configuration of "DDSUU." The vertical dimension corresponds to the frequency domain, and the horizontal dimension corresponds to the time domain. Each unshaded block in FIG. 4 corresponds to a slot, and each shaded block corresponds to one or more symbol within a slot for sending an SSB.

After detecting a SSB successfully, a UE receives System Information Block 1 (SIB1) for further obtaining initial access configuration information carried in SIB1 Physical Downlink Shared Channel (PDSCH). SIB1 Physical Downlink Control Channel (PDCCH), which can also be referred to as Type0 PDCCH, includes monitoring occasion configuration information such as Control Resource Set (CORESET) and Search Space Set (SS) are indicated by fields controlResourceSetZero and searchSpaceZero in PBCH, respectively. In some examples, the SS for Type0 PDCCH is Search Space Zero (SS0), and the associated CORESET is CORESET #0. The field of controlResourceSetZero is 4 bits, which supports indication of at most 16 different CORESET configurations within a CORESET configuration set. Similarly, there are also 4 bits for searchSpaceZero, which supports indication of at most 16 different SS configurations within a search space set configuration set. The CORESET/SS configurations within each configuration set can be predefined.

Figure 5:
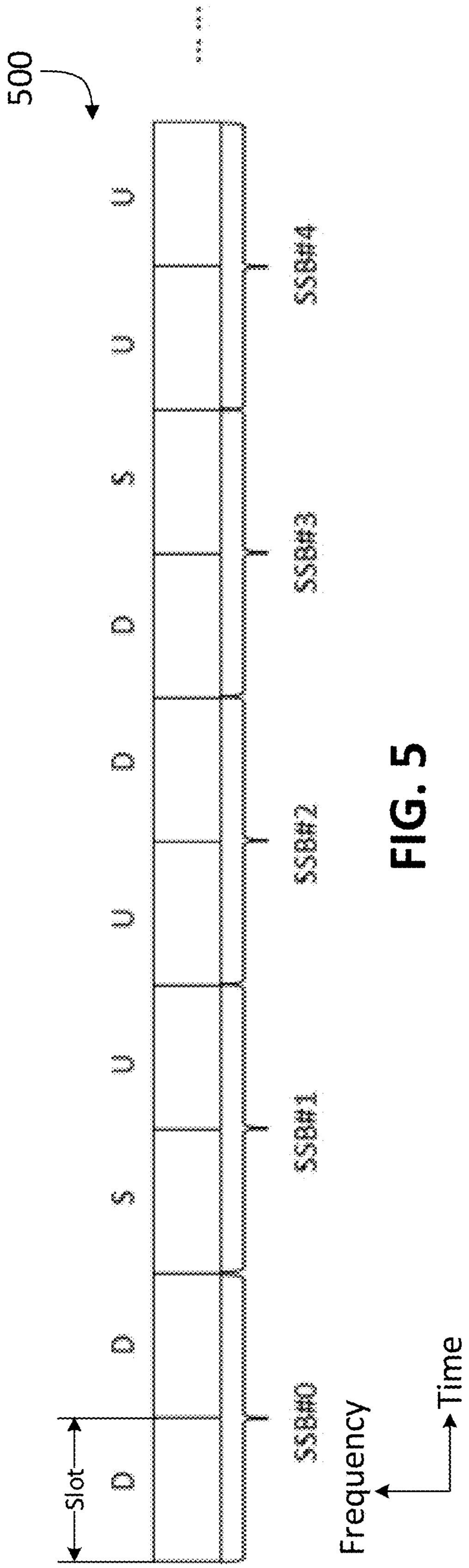
FIG. 5 illustrates an example frame structure for transmitting SSB.

Regarding SS0, each SSB corresponds to two consecutive slots, and each slot contains one monitoring occasion. The BS can select either one for transmitting the Type0 PDCCH. FIG. 5 illustrates an example frame structure 500 for mapping between SSB and slots of monitoring occasion under SS0. The vertical dimension corresponds to the frequency domain, and the horizontal dimension corresponds to the time domain. The frame structure 500 includes slots configured as "DDSUU." Two uplink slots correspond to SSB #4. The BS cannot allocate a resource for transmitting the Type0 PDCCH. Therefore, SSB #4 also cannot be used for initial access.

According to the initial access configuration information carried in SIB1 PDSCH, a UE can send a Physical Random Access Channel (PRACH) (e.g., preamble or msg1) in a PRACH transmission resource, e.g., a Random Access Channel (RACH) Occasion (RO) associated with a selected SSB. The association between SSB and RO is made according to a predefined rule. Before the association, UE first determines which of ROs are valid ROs. The association between actually transmitted SSBs and valid ROs can be determined. In some examples, for a UE being provided tdd-UL-DL-ConfigurationCommon, a PRACH occasion in a PRACH slot is determined to be valid in response to determining that 1) the PRACH occasion is within UL symbols, or 2) the PRACH occasion does not precede a SSB in the PRACH slot and starts at least $N_{gap}$ symbols after a last downlink symbol and at least $N_{gap}$ symbols after a last SSB symbol, where $N_{gap}$ is predefined. The candidate SSB index of the SSB corresponds to the SSB index provided by ssb-PositionsInBurst in SIB1 or in ServingCellConfigCommon. Accordingly, TDD frame structure impacts whether a configured RO is a valid RO.

For a TDD carrier, uplink and downlink transmissions are restricted by a specific frame structure. This restriction may cause extra delay in uplink and downlink transmissions or some transmission failures. Specifically, in the initial access process, SSB and SIB1 may not be able to send enough SSB due to the frame structure. The PRACH transmission delay is increased because there are insufficient uplink resources. The arrangements disclosed herein relieve the restriction or impact on uplink and downlink transmission caused by the frame structure of the TDD carrier.

Figure 6:
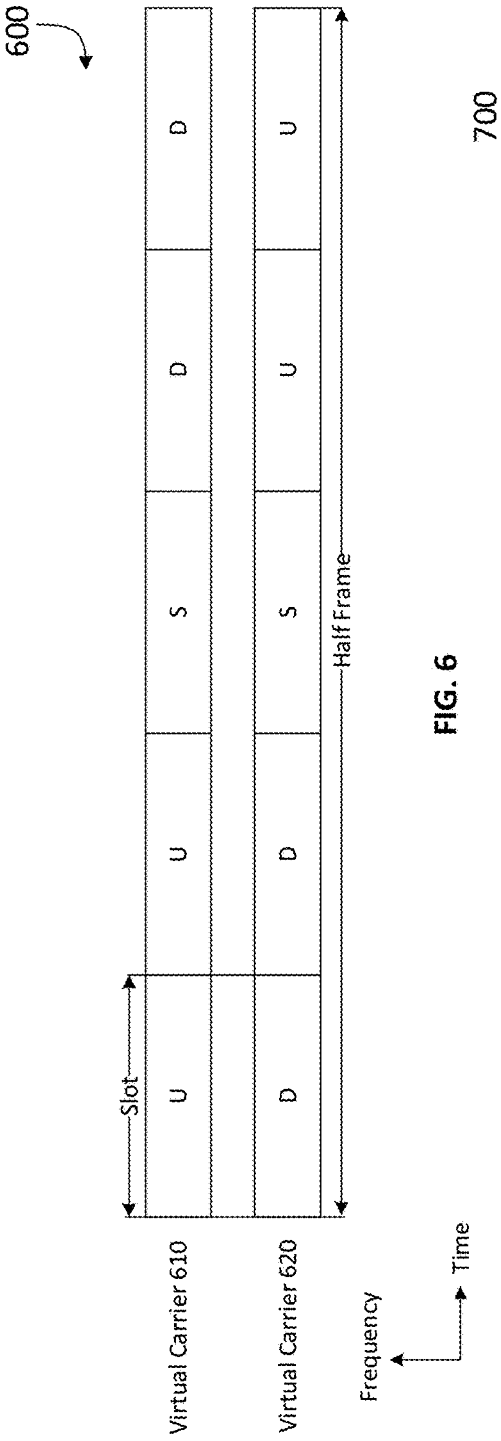
FIG. 6 is a diagram illustrating frame structures used for PRACH transmission, according to various arrangements.

FIG. 6 is a diagram illustrating frame structures 600 used for PRACH transmission, according to various arrangements. The vertical dimension corresponds to the frequency domain, and the horizontal dimension corresponds to the time domain. The frame structures 600 include two virtual carriers, a virtual carrier 610 and a virtual carrier 620, with different frame structures. The frame structure for each of the carriers 610 or 620 can be configured by the BS for a UE. A half frame of the frame structure for virtual carrier 610 is shown to include 5 slots, configured as "UUSDD." A half frame of the frame structure for virtual carrier 620 is shown to include 5 slots, configured as "DDSUU." The virtual carriers 610 and 620 complement each other so that uplink and downlink resources are represented more completely in the time domain. As shown, at any given slot in the time domain, there is an uplink resource and a downlink resource between the virtual carriers 610 and 620. In some cases, two virtual carriers can be configured to completely complement each other, that is, the uplink of a virtual carrier is configured to be aligned with or corresponding to the downlink of another virtual carrier in the time-domain. Thus, uplink and downlink resources always exist at the same time between the two virtual carriers. The uplink and downlink signal and channel can be transmitted on at least one of the two virtual carriers. The two virtual carriers may have the same or different bandwidths with the same or different numerologies. Similar concept can be extended to multiple (e.g., three or more) virtual carriers, such that at any given slot in the time-domain, there is at least an uplink slot and a downlink slot among the multiple virtual carriers. In some arrangements, multiple virtual carriers can partially complement each other. For example, the first virtual carrier can include an uplink resource when the second virtual carrier includes a downlink resource. In some examples, the first virtual carrier includes a downlink resource when the second virtual carrier includes an uplink resource.

In some arrangements, the two virtual carriers 610 and 620 are aggregated to implement a transmission together. An example of the transmission can be a transmission in the initial access procedure, such as a PRACH transmission. Two virtual carriers can be provided within a physical carrier or cell, each of which is referred to as a group of continuous resource blocks or a subband or a Bandwidth Part (BWP). In some examples, Two virtual carriers can be provided using two different physical carriers or cells. In other words, virtual carriers relate to frequency-domain resources that can be provided by the same physical carrier/cell or different physical carriers/cells.

In some examples, virtual carriers do not overlap with each other and can be adjacent to each other or occupy non-contiguous frequency domain resources (e.g., do not overlap in the frequency-domain). In other examples, two virtual carriers can overlap on at least one frequency-domain resource (e.g., overlap at least partially in the frequency-domain). In some examples, more than two virtual carriers can be aggregated with each other. Although two aggregated virtual carriers are used as examples for throughout this disclosure, similar concept can be extended to aggregating multiple (e.g., three or more) virtual carriers, such that an uplink transmission can be transmitted in an uplink slot on either one virtual carrier of the multiple virtual carriers. A downlink transmission can be transmitted in a downlink slot on either one virtual carrier of the multiple virtual carriers.

In some arrangements, the network (e.g., the BS) transmits to the UE Type0 PDCCH on multiple virtual carriers, e.g., virtual carriers 610 and 620.

Figure 7:
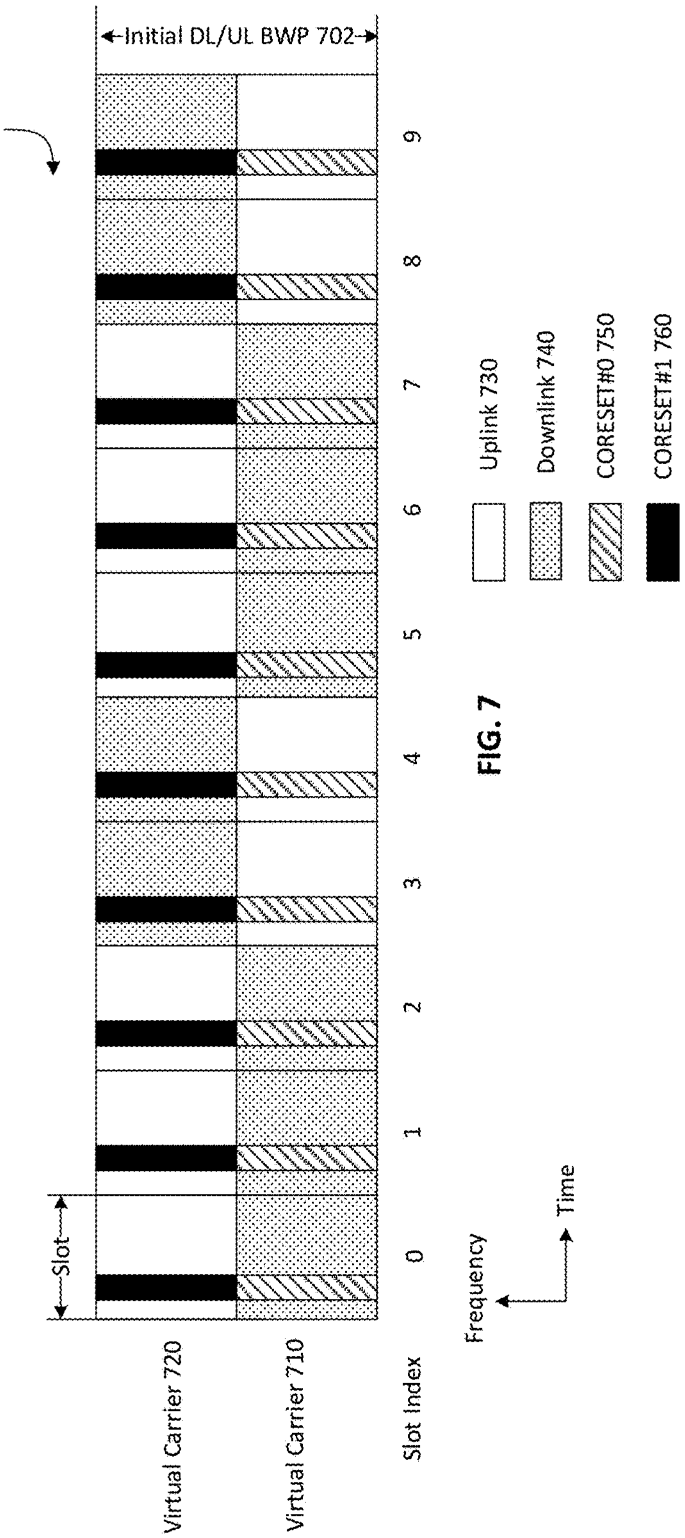
FIG. 7 is a diagram illustrating a frame structure of two virtual carriers, according to various arrangements.

FIG. 7 is a diagram illustrating a frame structure 700 of two virtual carriers, according to various arrangements. The vertical dimension corresponds to the frequency domain, and the horizontal dimension corresponds to the time domain. Uplink resources 730 as shown as solid white blocks, and downlink resources 740 are shown as shaded blocks. The frame structure 700 includes two virtual carriers 710 and 720, and the combined frequency range of the virtual carriers 710 and 720 spans an initial downlink/uplink BWP 702 (e.g., an initial downlink BWP or initial uplink BWP). The BS can transmit an SSB in either one of the virtual carriers (e.g., virtual carrier 710). In some examples, first information includes at least a frequency position, bandwidth, and time-domain resources of the first downlink resource (e.g., virtual carrier 710). The second information includes at least a position, bandwidth, and time-domain resources of the second downlink resource (e.g., virtual carrier 720). As shown in FIG. 7, in some examples, the bandwidth of the first downlink resource (e.g., a downlink resource of the virtual carrier 710) is same as the bandwidth of the first virtual carrier (e.g., the virtual carrier 710). The bandwidth of the second downlink resource (e.g., a downlink resource of the virtual carrier 720) is same as the bandwidth of the second virtual carrier (e.g., the virtual carrier 720).

In some arrangements, the frequency position and bandwidth of the virtual carrier (e.g., virtual carrier 710) used for transmitting the SSB is indicated in the PBCH of SSB. More specifically, controlResourceSetZero in PBCH is used for indicating CORESET configuration for Type0 PDCCH transmission (e.g., CORESET #0 750). The frequency position includes at least one of starting frequency, ending frequency, or median frequency. Then, the virtual carrier 710 can be defined as or corresponding to CORESET #0 750. The configuration of CORESET #0 750 also contains CORESET duration (e.g., a number of symbols of CORESET #0).

In some arrangements, the UE can determine the frequency position and bandwidth of initial downlink/uplink BWP 702 according to CORESET #0 750. For example, the bandwidth of the initial downlink/uplink BWP 702 can be a multiple of the bandwidth of CORESET #0 750, e.g., twice. The lowest RB of the initial downlink/uplink BWP 702 (e.g., of the initial downlink BWP or initial uplink BWP) is the lowest RB of the CORESET #0, in some examples as shown in FIG. 7. In other examples, the highest RB of the initial downlink/uplink BWP 702 (e.g., of the initial downlink BWP or initial uplink BWP) is the highest RB of the CORESET #0. In some examples, the UE determines third information of an initial BWP (e.g., the initial downlink/uplink BWP 702) based on the first information. The third information includes at least a frequency position or bandwidth of the initial BWP. In some examples, determining the third information based on the first information includes at least one of: determining that the bandwidth of the initial BWP is a multiple of the bandwidth of the first downlink resource, determining that a lower boundary (e.g., lowest RB) of the bandwidth of the initial BWP is same as a lower boundary of the first downlink resource, or determining that an upper boundary (e.g., highest RB) of the bandwidth of the initial BWP is same as an upper boundary of the first downlink resource.

Then, another CORESET (e.g., CORESET #1 760) in another virtual carrier (e.g., the virtual carrier 720 or second virtual carrier) is determined according to predefined rule. In some examples, the CORESET #1 760 has a same bandwidth as CORESET #0 750. In some examples, the lowest RB of the CORESET #1 760 is the lowest RB of the initial downlink/uplink BWP 702. In some examples, the highest RB of the CORESET #1 760 is the highest RB of the initial downlink/uplink BWP 702. The CORESET #1 760 has a same number of symbols as CORESET #0. In some examples, determining the second information for the second virtual carrier 720 based on the first information includes one of: determining that a lower boundary of the first downlink resource is an upper boundary of the second downlink resource, or determining that an upper boundary of the first downlink resource is a lower boundary of the second downlink resource, a number of the time-domain resources of the first downlink resource is same as a number of the time-domain resources of the second downlink resource.

Both of CORESET #0 750 and CORESET #1 760 are associated with a same SS, e.g. SS #0, through which the time-domain position of CORESET #0 750 and CORESET #1 760 can be configured. Then, CORESET #0 750 and CORESET #1 760 occur in the same time-domain resource, and are Frequency-Domain Multiplexed (FDMed) with each other. A UE monitors Type0-PDCCH in both CORESET #0 750 and CORESET #1 760 according to the SS configuration. In some examples, the first information and the second information includes a same SS via which time-domain positions of the first downlink resource and the second downlink resource is configured. The time-domain resources of the first downlink resource are same as time-domain resources of the second downlink resource.

As an example, CORESET #0 750 is configured with 24 RBs in the frequency domain and 2 symbols in the time domain. The initial downlink/uplink BWP 702 contains 48 RBs, which is two times the bandwidth of 24 RB of CORESET #0 750. The lowest RB of the initial downlink/uplink BWP 702 is the lowest RB of the CORESET #0 750. Another 24 RBs in higher frequency range within the initial downlink/uplink BWP 702 is determined as CORESET #1 760. CORESET #1 760 also has 2 symbols. The BS further configures for the UE SS via searchSpaceZero in PBCH. The time-domain positions of both CORESETs 750 and 760 can determined as shown in the frame structure 700. In particular, the CORESETs 750 and 760 use the same time-domain resources. Then, the UE monitors Type0-PDCCH in both CORESET #0 and CORESET #1.

In some arrangements, the frequency position and bandwidth of the initial downlink/uplink BWP 702 (e.g., the initial DL BWP or initial UL BWP) is indicated in the PBCH of SSB, e.g., via controlResourceSetZero. In some examples, the UE determines (e.g., receives in PBCH of SSB) first information and second information based on third information of an initial BWP (e.g., the initial downlink/uplink BWP). The first information includes at least a frequency position, bandwidth, and time-domain resources of the first downlink resource. The second information includes at least a position, bandwidth, and time-domain resources of the second downlink resource. The third information includes at least a frequency position or bandwidth of the initial BWP. The initial downlink/uplink BWP 702 can be partitioned into multiple parts, each part corresponding to a virtual carrier. For example, the initial downlink/uplink BWP 702 is partitioned into two parts, each of which correspond to the virtual carrier 710 or 720, respectively. The partition is performed by the UE based on predefined rules. For example, the initial downlink/uplink BWP 702 in the frequency domain is divided into multiple (e.g., two) equal parts by taking average of the frequency range of the downlink/uplink BWP 702. In some examples, the initial downlink/uplink BWP 702 is divided into multiple (e.g., two) parts in accordance with a certain proportion (e.g., a percentage or proportion of the frequency range of the initial downlink/uplink BWP 702 is assigned for each virtual carrier). Then, the bandwidth and position of the two CORESETs (e.g., CORESET #0 and CORESET #1) can be determined accordingly. The two CORESETs are located into two virtual carriers 710 and 720, with same bandwidth as its respective virtual carrier, as shown in FIG. 7. In some examples, the UE determines the first information and the second information based on the third information includes partitioning, by the UE, the bandwidth of the initial BWP into a first part corresponding to the bandwidth of the first downlink resource and a second part corresponding to the bandwidth of the second downlink resource.

Both of CORESET #0 750 and CORESET #1 760 are associated with a same SS, e.g. SS #0, through which the time-domain position of CORESET #0 750 and CORESET #1 760 can be configured. Then, CORESET #0 750 and CORESET #1 760 occur in the same time-domain resource, and are FDMed with each other. The UE monitors Type0-PDCCH in both CORESET #0 750 and CORESET #1 760 according to the SS configuration.

As an example, initial downlink/uplink BWP 702 is configured with 48 RBs. Then, the initial downlink/uplink BWP 702 is partitioned into two equal parts by taking an average of the bandwidth of the initial downlink/uplink BWP 702 over two virtual carriers. Then, two CORESETs 750 and 760, each of which contains 24 RBs, can be respectively determined.

In some arrangements, the BS sends to the UE two sets of CORESET configurations for the CORESETs 750 and 760, for example using PBCH. Each of two sets of CORESET configurations corresponds to a virtual carrier. The UE monitors Type0-PDCCH in both CORESET #0 750 and CORESET #1 760.

Regarding mapping of DMRS of Type0-PDCCH in CORESET #0 and the corresponding PDSCH, the frequency-domain reference point is subcarrier 0 of the lowest-numbered RB in initial DL BWP or subcarrier 0 of the lowest-numbered RB in CORESET #0. Regarding mapping of DMRS of Type0-PDCCH in CORESET #1 and the corresponding PDSCH, the frequency-domain reference point is subcarrier 0 of the lowest-numbered RB in initial DL BWP or subcarrier 0 of the lowest-numbered RB in CORESET #1. In some examples, the UE determines a mapping of DMRS of the downlink control information to a downlink channel (e.g., PDSCH) of the first downlink resource based on a first frequency-domain reference point, the first frequency-domain reference point is determined based on a lowest frequency resource (e.g., the lowest numbered RB) of an initial downlink BWP or a lowest frequency resource of the first downlink resource. The UE determines a mapping of the DMRS of the downlink control information to a downlink channel of the second downlink resource based on a second frequency-domain reference point. The second frequency-domain reference point is determined based on the lowest frequency resource of the initial downlink BWP or a lowest frequency resource of the second downlink resource.

As shown, some of the CORESETs are located in uplink resources 730, e.g., CORESET #1 in slot indices 0, 1, 2, 5, 6, 7 in virtual carrier 720, and CORESET #0 in slot indices 3, 4, 8, 9 in virtual carrier 710. The BS cannot transmit PDCCH in such CORESET in the uplink resources 730 to the UE. That said, the remaining CORESETs in the downlink resources 740 (e.g., CORESET #1 in slot indices 3, 4, 8, and 9 in virtual carrier 720, and CORESET #0 in slot indices 0, 1, 2, 5, 6, and 7 in virtual carrier 710) can be used by the BS for transmitting Type0-PDCCH. Comparing with Type0-PDCCH transmission using a single TDD carrier, this will provide more time-domain opportunities for transmitting Type0-PDCCH and the corresponding PDSCH, i.e., SIB1 PDSCH.

Figure 8:
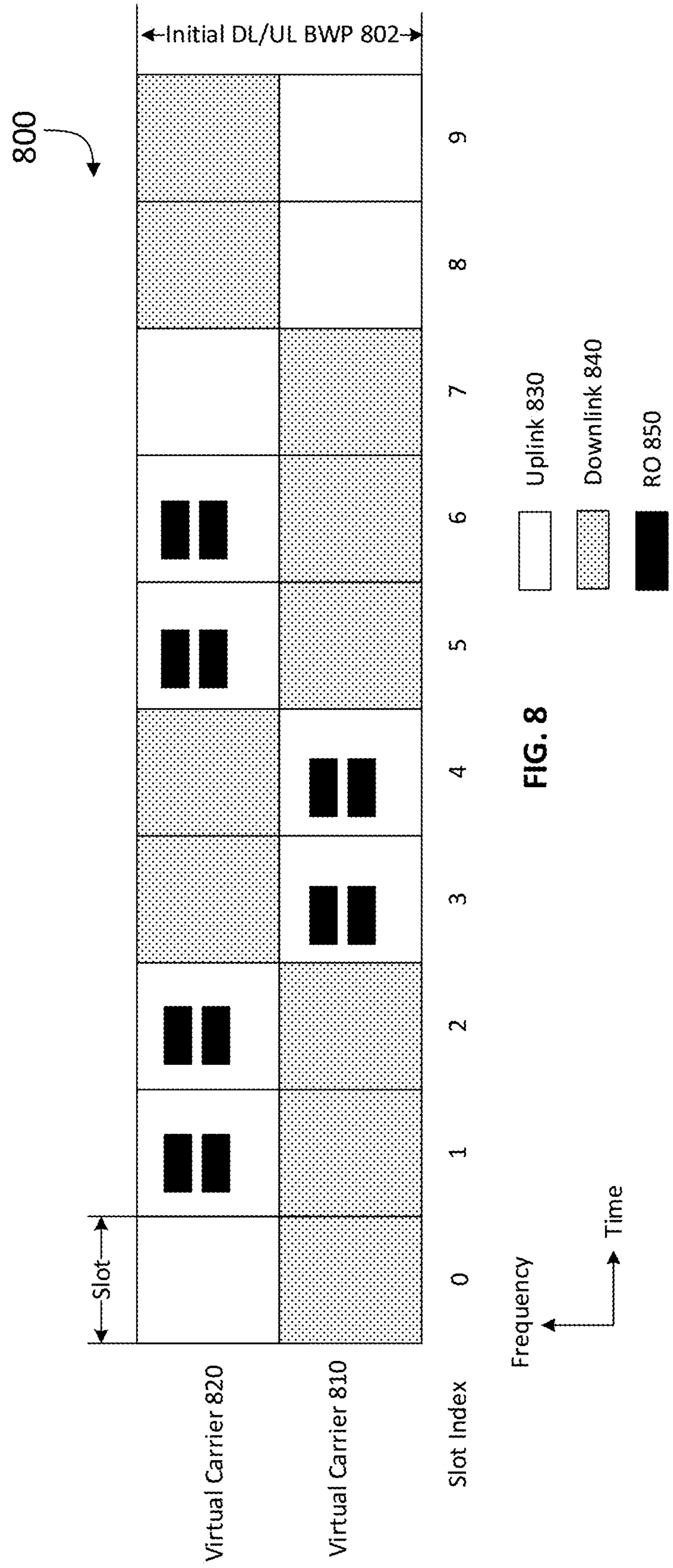
FIG. 8 is a diagram illustrating a frame structure of two virtual carriers, according to various arrangements.

In some arrangements, PRACH can be transmitted on multiple virtual carriers. FIG. 8 is a diagram illustrating a frame structure 800 of two virtual carriers, according to various arrangements. The vertical dimension corresponds to the frequency domain, and the horizontal dimension corresponds to the time domain. Uplink resources 830 as shown as solid white blocks, and downlink resources 840 are shown as shaded blocks. The frame structure 800 includes two virtual carriers 810 and 820, and the combined frequency range of the virtual carriers 810 and 820 spans an initial downlink/uplink BWP 802 (e.g., an initial downlink BWP or initial uplink BWP). The BS can transmit an SSB in either one of the virtual carriers (e.g., virtual carrier 810). The RO 850 can be configured in both of the two virtual carriers 810 and 820.

Figure 9:
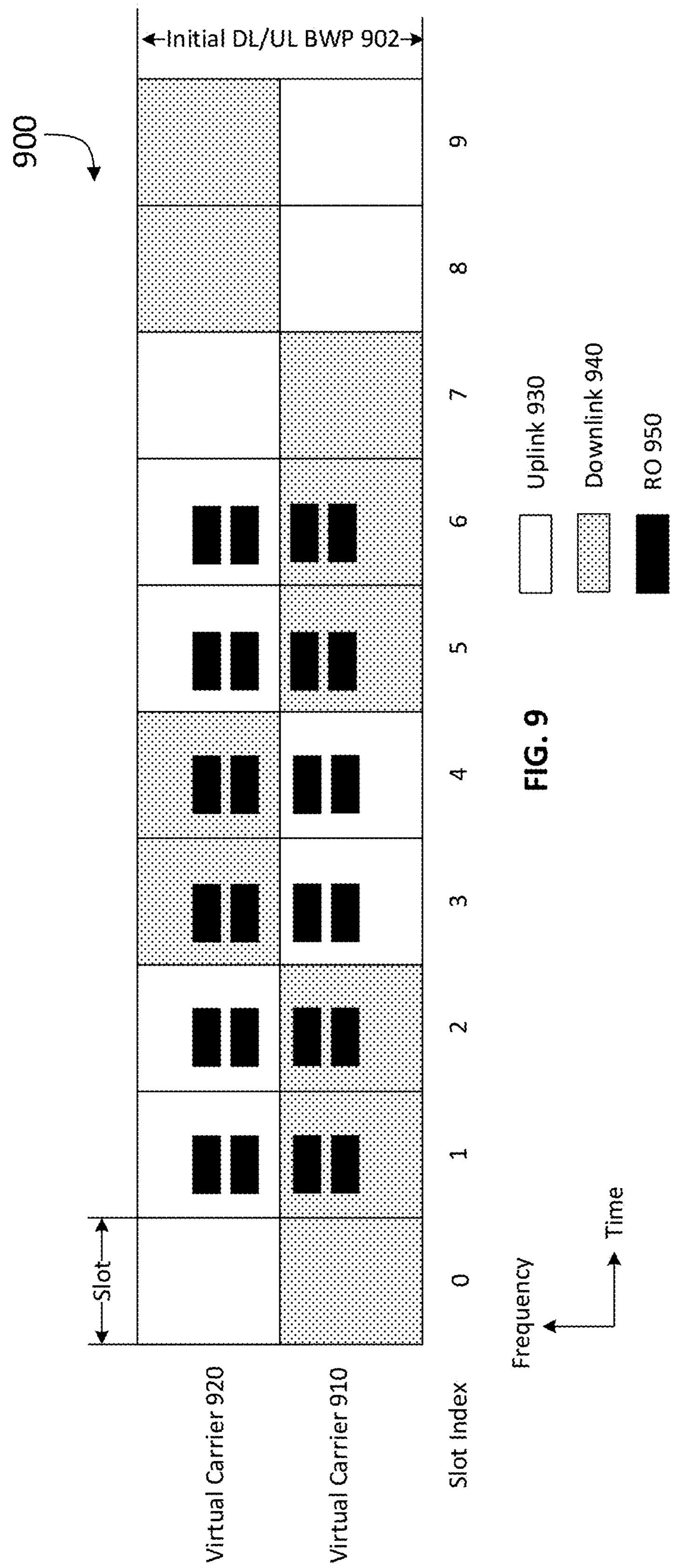
FIG. 9 is a diagram illustrating a frame structure of two virtual carriers, according to various arrangements.

FIG. 9 is a diagram illustrating a frame structure 900 of two virtual carriers, according to various arrangements. The vertical dimension corresponds to the frequency domain, and the horizontal dimension corresponds to the time domain. Uplink resources 930 as shown as solid white blocks, and downlink resources 940 are shown as shaded blocks. The frame structure 900 includes two virtual carriers 910 and 920, and the combined frequency range of the virtual carriers 910 and 920 spans an initial downlink/uplink BWP 902 (e.g., an initial downlink BWP or initial uplink BWP). The BS can transmit an SSB in either one of the virtual carriers (e.g., virtual carrier 910). The RO 950 can be configured in both of the two virtual carriers 910 and 920.

In some arrangements, the BS can configure for the UE the frequency starting point of an RO 850 and 950 via RRC signaling, e.g., via the message msg1-FrequencyStart. The BS can configure for the UE the number of FDMed ROs 850 and 950 via RRC signaling, e.g., via the message msg1-FDM. For example, the number of FDMed ROs 850 and 950 can be a value selected from 1, 2, 4, and 8. As shown in FIGS. 8 and 9, the number of FDMed ROs 850 is 2 and the number of FDMed ROs 950 is 4.

In some arrangements, the frequency positions of RO in each virtual carrier will be determined within each virtual carrier, respectively. In some examples, the uplink resource includes ROs. The ROs include first ROs in the first virtual carrier and second ROs in the second virtual carrier. The UE receives configuration information (e.g., first configuration information) for both of the first ROs and the second ROs. The UE determines frequency positions of the first ROs based on RBs of the first virtual carrier and the configuration information. The UE determines frequency positions of the second ROs based on RBs of the second virtual carrier and the configuration information.

More specifically, as shown in FIG. 8, there are two FDMed ROs 850 within each virtual carrier 810 or 820 as configured by RRC signaling, e.g., msg1-FDM. For virtual carrier 810, the frequency resources (e.g., the vertical dimension) are numbered and spanning from $RB_{0,vc1}$ to $RB_{max,\ vc1}$. The lowest RB of the lowest frequency RO within virtual carrier 810 can be determined by the UE according to msg1-FrequencyStart, e.g., value corresponding to the lowest RB of the lowest frequency RO is set to n. Then, $RBD_{n,vc1}$ can be determined to be the lowest RB of the lowest frequency RO within virtual carrier 810. For virtual carrier 820, the frequency resource are numbered from $RB_{0,vc2}$ to $RB_{max,\ vc2}$. The lowest RB of the lowest frequency RO within virtual carrier 820 can be determined by the UE according to msg1-FrequencyStart, e.g., value corresponding to the lowest RB of the lowest frequency RO is set to n. Then, $RB_{n,vc2}$ will be the lowest RB of the lowest frequency RO within virtual carrier 820. Other configuration for PRACH transmission, e.g., time-domain resources, PRACH format, etc. can be shared by different virtual carriers.

In some arrangements, the BS can configure for the UE the frequency starting point of an RO 850 and 950 via RRC signaling, e.g., via the message msg1-FrequencyStart. The BS can configure for the UE the number of FDMed ROs 850 and 950 via RRC signaling, e.g., via the message msg1-FDM. For example, the number of FDMed ROs 950 can be a value selected from 1, 2, 4, and 8. As shown in FIGS. 9, the number of FDMed ROs 950 is 4. The BS configures the frequency starting point of the ROs and the number of FDMed ROs based on the bandwidth of the initial downlink/uplink BWP 902. In some examples, the uplink resource includes ROs. The ROs include first ROs in the first virtual carrier and second ROs in the second virtual carrier. The UE receives configuration information (e.g., second configuration information) for both of the first ROs and the second ROs. The UE determines frequency positions of the lowest RB of the lowest frequency RO within the initial BWP 902 based on a bandwidth of an initial BWP and the configuration information. Then, some of the ROs are located within the virtual carrier 910, and other ROs are located within the virtual carrier 920.

As shown in FIG. 9, there are four FDMed ROs 950 within the initial BWP 902. The frequency resources of the initial BWP 902 are numbered from $RB_{0,BWP}$ to $RB_{max,\ BWP}$. The lowest RB of the lowest frequency RO within the initial BWP 902 is determined according to msg1-FrequencyStart, e.g., value corresponding to the lowest RB of the lowest frequency RO is set to n. Then, $RB_{n,BWP}$ is determined by the UE to be the lowest RB of the lowest frequency RO.

According to such configuration, some ROs may be located in virtual carrier 910, and other ROs may be located in virtual carrier 920. The ROs which located within downlink resources 940 will be considered as invalid ROs, e.g., ROs in slot indices 1, 2, 5, 6 and virtual carrier 920, ROs in slot indices 3, 4 and virtual carrier 910. The UE determines, in some examples, that a RO is invalid in response to determining that the RO is located in identified downlink resources of the first virtual carrier or identified downlink resources of the second virtual carrier.

In some arrangements, the UE can determine that certain RO can be considered as a valid RO in response to determining that 1) an RO in an uplink resource, or 2) the RO does not precede a SSB in a PRACH slot and starts at least $N_{gap}$ symbols after a last downlink symbol and at least $N_{gap}$ symbols after a last SSB symbol, where $N_{gap}$ is predetermined. In other words, in some examples, the UE determines that a RO is valid in response to determining at least one of: the RO is located in identified uplink resources of the first virtual carrier or identified uplink resources of the second virtual carrier; or the RO does not precede a SSB in a PRACH slot and starts at least a predetermined time period after a last downlink symbol and at least the predetermined time period after a last SSB symbol.

Other configuration for PRACH transmission, e.g., time-domain resources, PRACH format, etc. can be shared by different virtual carriers.

In some arrangements, the BS can configure for the UE are two set of frequency resource configurations for ROs in different virtual carriers, respectively. In some examples, the uplink resource includes ROs. The ROs include first ROs and second ROs. The UE receives first configurations for frequency positions and number of FDMed ROs for the first ROs in the first virtual carrier and second configurations for frequency positions and number of FDMed ROs for the second ROs in the second virtual carrier. For example, the BS sends the first set of configuration parameters msg1-FrequencyStart and msg1-FDM for respectively indicating the frequency starting point of the RO and the number of FDMed ROs for the virtual carrier 810/910. Similarly, for virtual carrier 2, the BS sends the second set of configuration parameters msg1-FrequencyStart and msg1-FDM for respectively indicating the frequency starting point of the RO and the number of FDMed ROs for the virtual carrier 820/920. The PRACH transmission in multiple virtual carriers can be implemented accordingly, thus increasing the number of valid ROs, through which improved efficiency in accessing to the network can be expected.

Some arrangements relate to determining PRACH transmission power on multiple virtual carriers. In response to determining that the access procedure initiated by a PRACH transmission fails, the UE sends the PRACH again to trigger a new access procedure. This process is referred to as PRACH reattempt. For PRACH reattempt, the UE increases the PRACH transmission power according to certain configuration. There are methods for determining the PRACH transmission power when multiple virtual carriers are used for PRACH transmission. The configuration parameters related with power determination includes at least one of PRACH target reception power at gNB (preambleReceivedTargetPower), maximum transmission number of PRACH (preamble TransMax), and power ramping step (PowerRampingStep). The PRACH target reception power at gNB is used for determined the initial power of PRACH transmission. The maximum transmission number of PRACH represents the maximum transmission number of PRACH. The power ramping step represents the power increase of each reattempt. The BS can configure such parameters for the UE. FIG. 10 is a table 1000 illustrating example definitions of transmission power parameters, according to some arrangements. As shown, the PRACH target reception power can be an integer from −202 to −60 in some examples. The maximum transmission number of PRACH can be a number selected from the set n3, n4, n5, n6, n7, n8, n10, n20, n50, n100, and n200 (e.g., 3 times, 4 times, 5, times, 6 times, 7 times, 8 times, 10 times, 20 times, 50 times, 100 times, and 200 times) in some examples. The power ramping step can be a number selected from dB0, dB2, dB4, and dB6 in some examples.

In some arrangements, one or more power ramping counters for recording the number of power ramping (N) can be implemented by the UE. Then, the transmission power of PRACH reattempt can be determined based on the power ramping. FIG. 11 is a table 1100 illustrating an example relationship between transmission attempts of the preamble of the PRACH and the transmission power, according to some arrangements. In an example shown in table 1100, $P_0$ is the power for PRACH initial transmission, which is determined according to the PRACH PRACH target reception power and path loss, and A is the power ramping step size, which is determined according to power ramping step. For any reattempt of the preamble, the power can be determined by adding $P_0$ and the product of N and A.

In some arrangements, the UE receives from the BS power parameters for each virtual carrier, which is configured with the power parameters independently. Different virtual carriers can share a same power ramping counter. Then, for PRACH transmission (including, initial transmission and reattempt), the power is determined according to the configured parameters for the virtual carrier on which the PRACH is transmitted and the value of power ramping counter. In some examples, the UE receives from the network, at least one first power parameter for the first virtual carrier and at least one second power parameter for the second virtual carrier. The at least one first power parameter and the at least one second power parameter are configured for the first virtual carrier and the second virtual carrier independently. The UE determines a first power for sending the uplink access signal on the uplink resource of the first virtual carrier based on the at least one first power parameter and a power ramping counter. The UE determines a second power for sending another uplink access signal on another uplink resource of the second virtual carrier based on the at least one second power parameter and the power ramping counter (e.g., the same power ramping counter).

FIG. 12 is a table 1200 illustrating an example relationship between transmission attempts of the preamble of the PRACH and the transmission power, according to some arrangements. $P_{0,vc(1)}$ is power for initial transmission on a first virtual carrier (vc1), $P_{0,vc(2)}$ is power for initial transmission on a second virtual carrier (vc2), $\Delta_{vc(1)}$ is power ramping step size for PRACH reattempt on vc1, and $\Delta_{vc(2)}$ is power ramping step size for PRACH reattempt on vc2. Then, for the $N^{st}$ PRACH reattempt, the UE can determine the power to be $P_{0,vc(x)}+N\times\Delta_{vc(x)}$, where x represents virtual carrier index on which the $N^{st}$ PRACH reattempt is transmitted.

In some arrangements, different virtual carriers share a same set of power parameters, and each virtual carrier has its own power ramping counter. For PRACH transmission (including, initial transmission and reattempt), the power is determined according to the configured parameters and the value of power ramping counter for the virtual carrier on which the PRACH is transmitted. For example, assuming $P_0$ is power for initial transmission on a first virtual carrier, $\Delta$ is power ramping step size for PRACH reattempt. Then, for the $N^{st}$ PRACH reattempt on the first virtual carrier, the power can be calculated using $P_0+N\times\Delta$. In some examples, the UE receives from the network at least one power parameter for the first virtual carrier and for the second virtual carrier. The UE determines a first power for sending the uplink access signal on the uplink resource of the first virtual carrier based on the at least one power parameter and a first power ramping counter. The UE determines a second power for sending another uplink access signal on another uplink resource of the second virtual carrier based on the at least one power parameter and a second power ramping counter. The first and second power ramping counters are implemented separately and may be different.

In some arrangements, PRACH can be transmitted on multiple virtual carriers. Different methods can be implemented for determining the mapping between SSB and ROs in multiple virtual carriers. Further, two or more SSBs can associate with one RO according to RRC configuration, and different PRACH indices can associate with different SSBs that are associated with one RO. One SSB can also associate with one or more ROs according to RRC configuration. Thus, in some examples, the UE determines at least one valid RO in both the first carrier and the second carrier. The UE orders the at least one valid RO and associates each of at least one SSB with one of the at least one valid RO.

Figure 13:
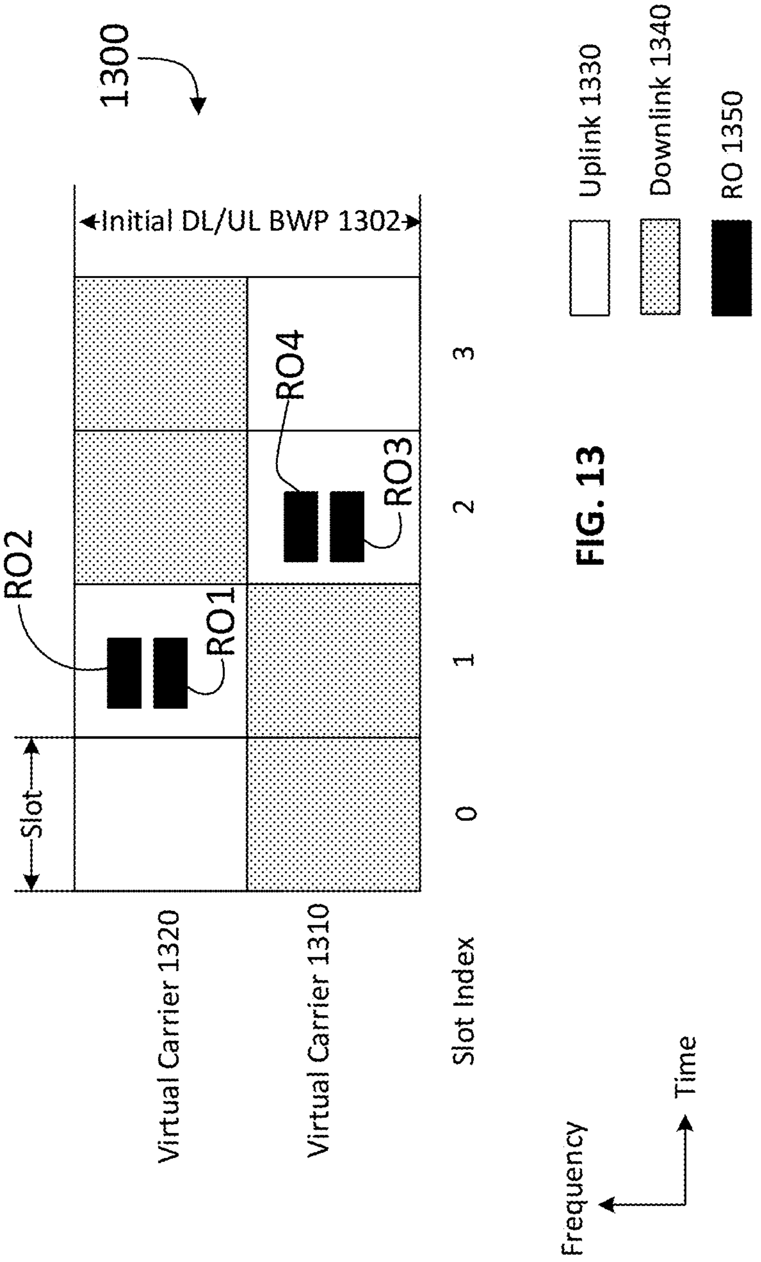
FIG. 13 is a diagram illustrating example frame structure of two virtual carriers, according to various arrangements.

In some arrangements, valid ROs in multiple virtual carriers can be ordered or sorted according to a predefined rule. FIG. 13 is a diagram illustrating example frame structure 1300 of two virtual carriers, according to various arrangements. The vertical dimension corresponds to the frequency domain, and the horizontal dimension corresponds to the time domain. Uplink resources 1330 as shown as solid white blocks, and downlink resources 1340 are shown as shaded blocks. The frame structure 1300 includes two virtual carriers 1310 and 1320, and the combined frequency range of the virtual carriers 1310 and 1320 spans an initial downlink/uplink BWP 1302 (e.g., an initial downlink BWP or initial uplink BWP). The RO 1350 can be configured in both of the two virtual carriers 1310 and 1320.

Figures 14, 15:
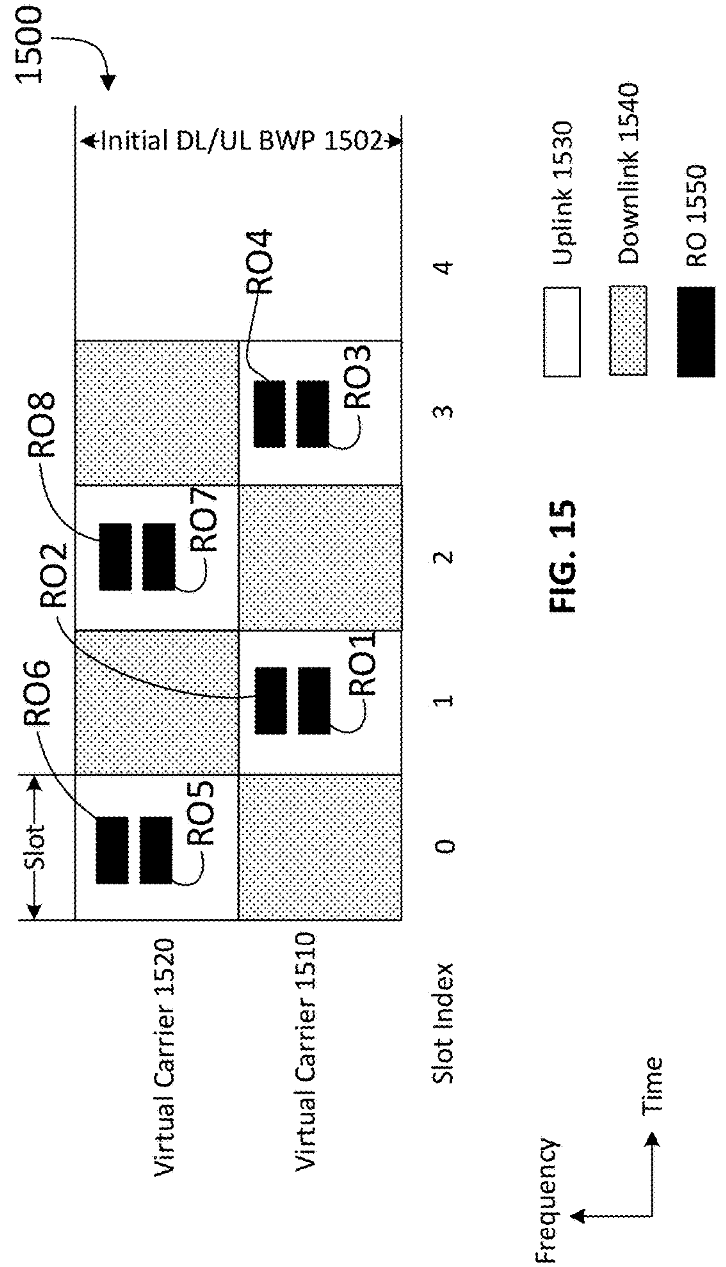
FIG. 14 is a table illustrating an example association between transmitted SSBs and ROs, according to some arrangements.
FIG. 15 is a diagram illustrating example frame structure of two virtual carriers, according to various arrangements.

As shown in FIG. 13, there are 4 valid ROs 1350 shown in total (e.g., RO1~RO4). These ROs will be sorted according to following rules: first, in increasing order of frequency resource indices for frequency multiplexed PRACH occasions; second, in increasing order of time resource indices for time multiplexed PRACH occasions within a PRACH slot; and third, in increasing order of indices for PRACH slots. According to the three rules, the valid ROs are sorted as RO1, RO2, RO3, and RO4, in that order. In this example, one SSB is associated with one RO. In the example in which there are three SSBs are actually transmitted, e.g., SSB #0, SSB #1 and SSB #3. FIG. 14 is a table 1400 illustrating an example association between transmitted SSBs and ROs, according to some arrangements. As shown, SSB #0 is associated with RO1, SSB #1 is associated with RO2, and SSB #3 is associated with RO3. As shown, the SSBs are mapped to the sorted ROs based on the increasing order of SSB indices and the order of the sorted ROs. After one round association, each actually transmitted SSB becomes associated with an RO in an one-on-one mapping. There is a RO (e.g., RO4) without associate with any SSB. This RO, which ranked the lowest in the sorted sequence of ROs, will not be used for transmitting PRACH.

In some arrangements, the valid ROs are determined, sorted/ordered, and associated with the SSBs within an association period. More than one association period can be implemented, such that the same mechanism can be implemented for any association period.

In some arrangements, valid ROs in multiple virtual carriers can be ordered or sorted according to a predefined rule. FIG. 15 is a diagram illustrating example frame structure 1500 of two virtual carriers, according to various arrangements. The vertical dimension corresponds to the frequency domain, and the horizontal dimension corresponds to the time domain. Uplink resources 1530 as shown as solid white blocks, and downlink resources 1540 are shown as shaded blocks. The frame structure 1500 includes two virtual carriers 1510 and 1520, and the combined frequency range of the virtual carriers 1510 and 1520 spans an initial downlink/uplink BWP 1502 (e.g., an initial downlink BWP or initial uplink BWP). The RO 1550 can be configured in both of the two virtual carriers 1510 and 1520.

Valid ROs in multiple virtual carriers 1510 and 1520 will be sorted according to a predefined rule. As shown in FIG. 15, there are 8 valid ROs 1550 shown in total (e.g., RO1~RO8). These ROs will be sorted according to following rules: first, the ROs are sorted from virtual carrier dimension, e.g., starting from virtual carrier with lowest frequency, or lowest index. Then, similar rules disclosed relative to FIGS. 13 and 14 can be used relative to each virtual carrier. For example, second, in increasing order of frequency resource indices for frequency multiplexed PRACH occasions; third, in increasing order of time resource indices for time multiplexed PRACH occasions within a PRACH slot; and fourth, in increasing order of indices for PRACH slots. According to these four rules, the valid ROs are sorted as RO1-RO8, in that order. These ROs will be then associated with SSBs.

In some examples, the SSB-RO association will be made within each virtual carrier, respectively. Assuming the actually transmitted SSBs are SSB #0, SSB #1 and SSB #3. FIG. 16 is a table 1600 illustrating an example association between transmitted SSBs and ROs, according to some arrangements. As shown, SSB #0 is associated with RO1 and RO5, SSB #1 is associated with RO2 and RO6, and SSB #3 is associated with RO3 and RO7. As shown, the SSBs are mapped to the sorted ROs based on the increasing order of SSB indices and the order of the sorted ROs. For the virtual carrier 1510, after one round association, each actually transmitted SSB becomes associated with an RO in an one-to-one mapping. There is a RO (e.g., RO4) that is not associated with any SSB, and this RO is be used for transmitting PRACH. Similarly, for the virtual carrier 1520, after one round association, each actually transmitted SSB becomes associated with an RO in an one-to-one mapping. There is a RO (e.g., RO8) that is not associated with any SSB, and this RO is be used for transmitting PRACH.

In some examples, the SSB-RO association can be made across multiple virtual carriers, circularly. FIG. 17 is a table 1700 illustrating an example association between transmitted SSBs and ROs, according to some arrangements. In an example, the actually transmitted SSBs are SSB #0, SSB #1 and SSB #3 with respect to the frame structure 1500. As shown, SSB #0 is associated with RO1 and RO4, SSB #1 is associated with RO2 and RO5, and SSB #3 is associated with RO3 and RO6. The mapping can be performed based on the increasing order of the indices of the ROs and the indices of the SSBs. In a first round of association, each of the SSBs is associated with ROs in the ascending order of the indices of the ROs, such that SSB #0 is associated with RO1, SSB #1 is associated with RO2, and SSB #3 is associated with RO3. In a second round of association, each of the SSBs is associated with ROs in the ascending order of the indices of the ROs continuing after the first round of association, such that SSB #0 is additionally associated with RO4, SSB #1 is additionally associated with RO5, and SSB #3 is additionally associated with RO6. Thus, after two rounds of association, each actually transmitted SSB becomes associated with two ROs, which may span different virtual carriers based on the number of valid ROs in each virtual carrier. In particular, regarding the second round association, there are ROs located at different virtual carriers, e.g., RO4 is located in virtual carrier 1520, and the other ROs are located in virtual carrier 1510. There are two ROs (e.g., RO7 and RO8) that are not associated with any SSB, and are not to be used for transmitting PRACH.

In some examples, the at least one valid RO is ordered according to at least one of: frequency resource indices of the at least one valid ROs, time resource indices of the at least one valid ROs, and indices of slots; the first carrier and the second carrier; or increasing indices of the at least one valid ROs across the first carrier and the second carrier.

Accordingly, different mechanisms for mapping SSBs and ROs in multiple virtual carriers are defined, thus increasing the number of valid ROs, through which improved efficiency in accessing to the network can be expected.

In some arrangements, other data can be transmitted on multiple virtual carriers. As described herein, there can be two or more virtual carriers in one initial DL/UL BWP or physical carrier. Then, some information other than type0-PDCCH and ROs can also be received or transmitted by the UE via multiple virtual carriers in one BWP or one physical carrier.

In some arrangements, SSBs associated with a cell can be transmitted in different virtual carriers. The SSBs can indicate same or different CORESET #0 and Search space #0 for type0-PDCCH monitoring. Then, type0-PDCCH and corresponding PDSCH can be received by the UE either in a virtual carrier or different virtual carriers.

In some arrangements, a virtual carrier can be selected by a UE for PRACH transmission according to measurement or configuration in SIB1. Then, at least one of msg.2 and msg.4 can be transmitted by the BS and received by the UE in the same virtual carrier of PRACH transmission.

In some arrangements, system information other than MIB/SIB1 can be referred to as Other System Information (OSI). The OSI transmission can be requested by the UE to the BS by transmitting by the UE msg.1 or msg.3. Then, the virtual carrier for OSI transmitted by the BS and received by the UE is same as the virtual carrier for transmitting the msg.1 or msg.3 for OSI request. In some arrangements, the OSI is transmitted by the BS and received by the UE in a predefined virtual carrier.

In some arrangements, paging can be transmitted BS and received by the UE in a predefined virtual carrier or transmitted in both of the virtual carriers.

Accordingly, the arrangements disclosed herein relate to configuring transmission resource for signal and channel (including for example type0 PDCCH, RO, SSB/SIB1, OSI, msg.2/msg.4, paging, etc) during initial access procedure on multiple virtual carriers. The provision of multiple virtual carriers allow improved number of valid resources over time, through which more efficient accessing to the network can be expected.

Figure 18:
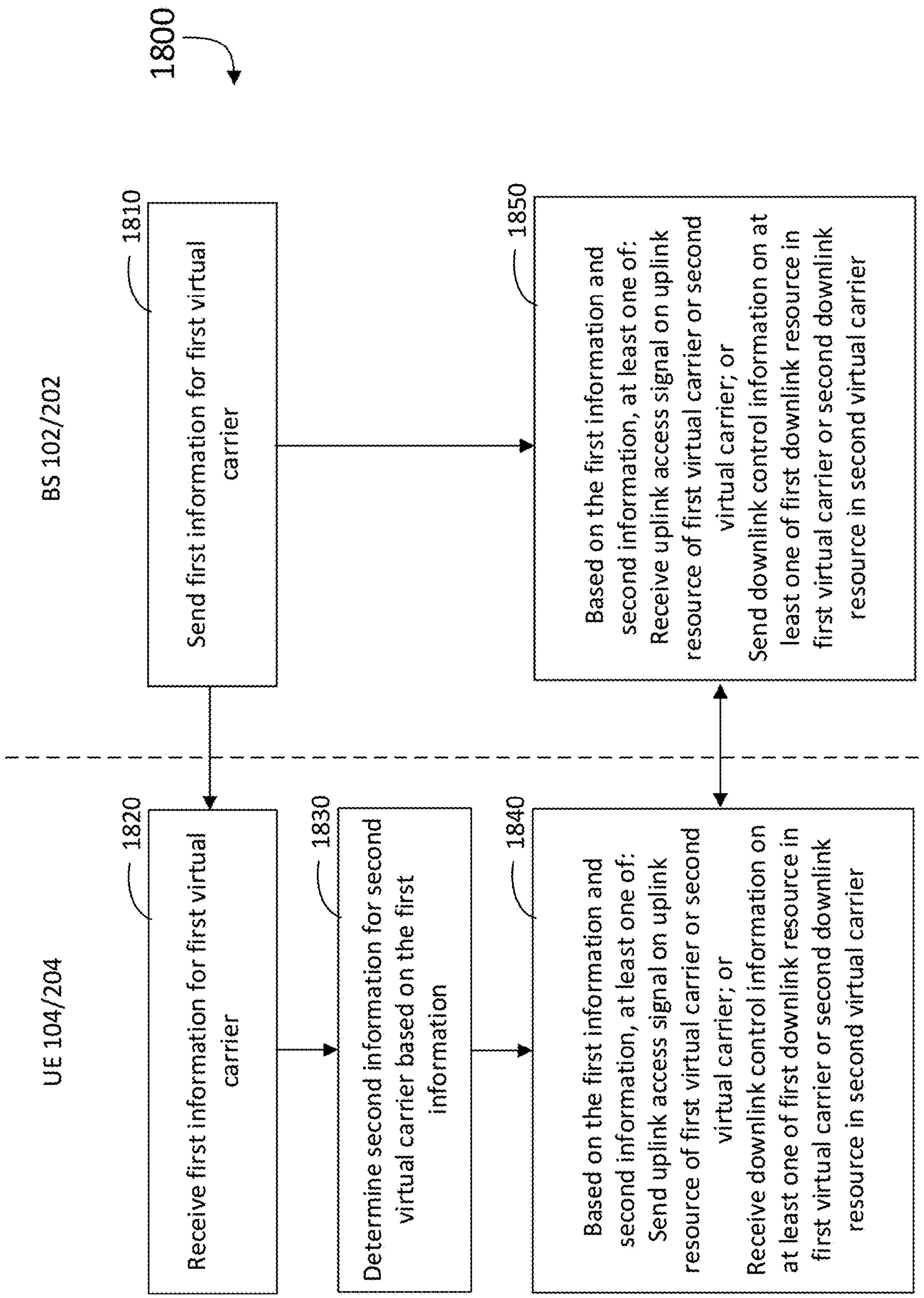
FIG. 18 is a flowchart diagram illustrating an example method for communicating data, according to various arrangements.

FIG. 18 is a flowchart diagram illustrating an example method 1800 for communicating data, according to various arrangements. Referring to FIGS. 1-18, the method 1800 can be performed by the UE (e.g., the UE 104/204) and the network, including at least one BS (e.g., BS 102/202). As used herein, the network refers to network entities other than the UE.

At 1810, the network (e.g., the BS) sends to the UE first information for a first virtual carrier. At 1820, the UE receives the first information for the first virtual carrier. In some examples, the first information includes configuration information of the first virtual carrier, such as CORESET #0, SS #0, and so on.

At 1830, the UE determines the second information for a second virtual carrier based on the first information. In some examples, the second information includes configuration information of the second virtual carrier, such as CORESET #1, SS #0, and so on.

At 1840, based on the first information and the second information, the UE sends to the network uplink access signal on an uplink resource of the first virtual carrier or the second virtual carrier in some examples. An example of the network uplink access signal is a preamble for the initial access procedure. An example of the uplink resource is an RO. In some examples, the UE receives from the network downlink control information on at least one of a first downlink resource in the first virtual carrier or a second downlink resource in the second virtual carrier based on the first information and the second information. An example of the downlink control information is type0 PDCCH.

At 1850, based on the first information and the second information, the network receives from the UE uplink access signal on an uplink resource of the first virtual carrier or the second virtual carrier in some examples. In some examples, the network sends to the UE downlink control information on at least one of the first downlink resource in the first virtual carrier or the second downlink resource in the second virtual carrier based on the first information and the second information.

In some examples, the first information includes at least a frequency position, bandwidth, and time-domain resources of the first downlink resource. The second information includes at least a position, bandwidth, and time-domain resources of the second downlink resource. In some examples, the bandwidth of the first downlink resource is same as the bandwidth of the first virtual carrier. The bandwidth of the second downlink resource is same as the bandwidth of the second virtual carrier.

In some examples, the UE determines third information of an initial BWP (e.g., the initial downlink/uplink BWP) based on the first information. The third information includes at least a frequency position or bandwidth of the initial BWP. In some examples, determining the third information based on the first information includes at least one of: determining that the bandwidth of the initial BWP is a multiple of the bandwidth of the first downlink resource, determining that a lower boundary (e.g., lowest RB) of the bandwidth of the initial BWP is same as a lower boundary of the first downlink resource, or determining that an upper boundary (e.g., highest RB) of the bandwidth of the initial BWP is same as an upper boundary of the first downlink resource.

In some examples, determining the second information based on the first information includes one of: determining that a lower boundary of the first downlink resource is an upper boundary of the second downlink resource, determining that an upper boundary of the first downlink resource is a lower boundary of the second downlink resource, a number of the time-domain resources of the first downlink resource is same as a number of the time-domain resources of the second downlink resource.

In some examples, the first information and the second information includes a same SS via which time-domain positions of the first downlink resource and the second downlink resource is configured. The time-domain resources of the first downlink resource are same as time-domain resources of the second downlink resource.

In some examples, the UE determines (e.g., receives in PBCH of SSB) first information and second information based on third information of an initial BWP (e.g., the initial downlink/uplink BWP). The first information includes at least a frequency position, bandwidth, and time-domain resources of the first downlink resource. The second information includes at least a position, bandwidth, and time-domain resources of the second downlink resource. The third information includes at least a frequency position or bandwidth of the initial BWP.

In some examples, the UE determines the first information and the second information based on the third information includes partitioning, by the UE, the bandwidth of the initial BWP into a first part corresponding to the bandwidth of the first downlink resource and a second part corresponding to the bandwidth of the second downlink resource.

In some examples, the UE determines a mapping of DMRS of the downlink control information to a downlink channel (e.g., PDSCH) of the first downlink resource based on a first frequency-domain reference point, the first frequency-domain reference point is determined based on a lowest frequency resource (e.g., the lowest numbered RB) of an initial downlink BWP or a lowest frequency resource of the first downlink resource. The UE determines a mapping of the DMRS of the downlink control information to a downlink channel of the second downlink resource based on a second frequency-domain reference point. The second frequency-domain reference point is determined based on the lowest frequency resource of the initial downlink BWP or a lowest frequency resource of the second downlink resource.

In some examples, the uplink resource includes ROs. The ROs include first ROs in the first virtual carrier and second ROs in the second virtual carrier. The UE receives configuration information (e.g., first configuration information) for both of the first ROs and the second ROs. The UE determines frequency positions of the first ROs based on RBs of the first virtual carrier and the configuration information. The UE determines frequency positions of the second ROs based on RBs of the second virtual carrier and the configuration information.

In some examples, the uplink resource includes ROs. The ROs include first ROs in the first virtual carrier and second ROs in the second virtual carrier. The UE receives configuration information (e.g., second configuration information) for both of the first ROs and the second ROs. The UE determines frequency positions of the first ROs and frequency positions of the second ROs based on a bandwidth of an initial BWP and the configuration information. The first and the second configuration information are different. The UE determines, in some examples, that a RO is invalid in response to determining that the RO is located in identified downlink resources of the first virtual carrier or identified downlink resources of the second virtual carrier.

In some examples, the UE determines that a RO is valid in response to determining at least one of: the RO is located in identified uplink resources of the first virtual carrier or identified uplink resources of the second virtual carrier; or the RO does not precede a SSB in a PRACH slot and starts at least a predetermined time period after a last downlink symbol and at least the predetermined time period after a last SSB symbol.

In some examples, the uplink resource includes ROs. The ROs include first ROs and second ROs. The UE receives first configurations for frequency positions and number of FDMed ROs for the first ROs in the first virtual carrier and second configurations for frequency positions and number of FDMed ROs for the second ROs in the second virtual carrier.

In some examples, the UE receives from the network, at least one first power parameter for the first virtual carrier and at least one second power parameter for the second virtual carrier. The at least one first power parameter and the at least one second power parameter are configured for the first virtual carrier and the second virtual carrier independently. The UE determines a first power for sending the uplink access signal on the uplink resource of the first virtual carrier based on the at least one first power parameter and a power ramping counter. The UE determines a second power for sending another uplink access signal on another uplink resource of the second virtual carrier based on the at least one second power parameter and the power ramping counter (e.g., the same power ramping counter).

In some examples, the UE receives from the network at least one power parameter for the first virtual carrier and for the second virtual carrier. The UE determines a first power for sending the uplink access signal on the uplink resource of the first virtual carrier based on the at least one power parameter and a first power ramping counter. The UE determines a second power for sending another uplink access signal on another uplink resource of the second virtual carrier based on the at least one power parameter and a second power ramping counter. The first and second power ramping counters are implemented separately and may be different.

In some examples, the UE determines at least one valid RO in both the first carrier and the second carrier. The UE orders the at least one valid RO and associates each of at least one SSB with one of the at least one valid RO.

In some examples, the at least one valid RO is ordered according to at least one of: frequency resource indices of the at least one valid ROs, time resource indices of the at least one valid ROs, and indices of slots; the first carrier and the second carrier; or increasing indices of the at least one valid ROs across the first carrier and the second carrier.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term “module” as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:

receiving, by a wireless communication device from a network, first information for a first virtual carrier, wherein the first information corresponds to configuration information that defines at least one of a first uplink resource or a first downlink resource of the first virtual carrier; and determining, by the wireless communication device, second information for a second virtual carrier based on the first information, wherein the second information corresponds to configuration information that defines at least one of a second uplink resource or a second downlink resource of the second virtual carrier; and based on the first information and the second information, at least one of:

sending, by the wireless communication device to the network, an uplink access signal on the first uplink resource of the first virtual carrier or the second uplink resource of the second virtual carrier; or receiving, by the wireless communication device from the network, downlink control information on at least one of the first downlink resource in the first virtual carrier or the second downlink resource in the second virtual carrier based on the first information and the second information.

2. The method of claim 1, wherein:

the first information comprises at least a frequency position, bandwidth, and time-domain resources of the first downlink resource;

the second information comprises at least a position, bandwidth, and time-domain resources of the second downlink resource.

3. The method of claim 2, wherein:

the bandwidth of the first downlink resource is same as the bandwidth of the first virtual carrier;

the bandwidth of the second downlink resource is same as the bandwidth of the second virtual carrier.

4. The method of claim 2, further comprising determining, by the wireless communication device, third information of an initial Bandwidth Part (BWP) based on the first information, wherein the third information comprises at least a frequency position or bandwidth of the initial BWP.

5. The method of claim 4, wherein determining the third information based on the first information comprises at least one of:

determining that the bandwidth of the initial BWP is a multiple of the bandwidth of the first downlink resource;

determining that a lower boundary of the bandwidth of the initial BWP is same as a lower boundary of the first downlink resource; or determining that an upper boundary of the bandwidth of the initial BWP is same as an upper boundary of the first downlink resource.

6. The method of claim 2, wherein:

the first information and the second information comprise a same Search Space Set (SS) via which time-domain positions of the first downlink resource and the second downlink resource is configured; and the time-domain resources of the first downlink resource are same as time-domain resources of the second downlink resource.

7. The method of claim 1, wherein determining the second information based on the first information comprises one of:

determining that a lower boundary of the first downlink resource is an upper boundary of the second downlink resource;

determining that an upper boundary of the first downlink resource is a lower boundary of the second downlink resource; or a number of time-domain resources of the first downlink resource is same as a number of time-domain resources of the second downlink resource.

8. The method of claim 1, further comprising determining, by the wireless communication device, first information and second information based on third information of an initial Bandwidth Part (BWP), wherein the first information comprises at least a frequency position, bandwidth, and time-domain resources of the first downlink resource, the second information comprises at least a position, bandwidth, and time-domain resources of the second downlink resource, and the third information comprises at least a frequency position or bandwidth of the initial BWP.

9. The method of claim 8, wherein determining the first information and the second information based on the third information comprises:

partitioning, by the wireless communication device, the bandwidth of the initial BWP into a first part corresponding to the bandwidth of the first downlink resource and a second part corresponding to the bandwidth of the second downlink resource.

10. The method of claim 1, further comprising:

determining, by the wireless communication device, a mapping of Demodulation Reference Signal (DMRS) of the downlink control information to a downlink channel of the first downlink resource based on a first frequency-domain reference point, the first frequency-domain reference point is determined based on a lowest frequency resource of an initial downlink Bandwidth Part (BWP) or a lowest frequency resource of the first downlink resource; and determining, by the wireless communication device, a mapping of the DMRS of the downlink control information to a downlink channel of the second downlink resource based on a second frequency-domain reference point, the second frequency-domain reference point is determined based on the lowest frequency resource of the initial downlink BWP or a lowest frequency resource of the second downlink resource.

11. The method of claim 1, wherein the first uplink resource and the second uplink resource comprise Random Access Channel (RACH) Occasions (ROs), the ROs comprising first ROs in the first virtual carrier and second ROs in the second virtual carrier;

the method further comprises:

receiving, by the wireless communication device, configuration information for both of the first ROs and the second ROs;

determining, by the wireless communication device, frequency positions of the first ROs based on Resource Blocks (RBs) of the first virtual carrier and the configuration information; and determining, by the wireless communication device, frequency positions of the second ROs based on RBs of the second virtual carrier and the configuration information.

12. The method of claim 1, wherein the first uplink resource and the second uplink resource comprise Random Access Channel (RACH) Occasions (ROs), the ROs comprising first ROs in the first virtual carrier and second ROs in the second virtual carrier; and the method further comprises:

receiving, by the wireless communication device, a configuration information for both of the first ROs and the second ROs; and determining, by the wireless communication device, frequency positions of the first ROs and frequency positions of the second ROs based on a bandwidth of an initial Bandwidth Part (BWP) and the configuration information.

13. The method of claim 12, further comprising determining, by the wireless communication device, that a RO is invalid in response to determining that the RO is located in identified downlink resources of the first virtual carrier or identified downlink resources of the second virtual carrier.

14. The method of claim 12, further comprising determining, by the wireless communication device, that a RO is valid in response to determining at least one of:

the RO is located in identified uplink resources of the first virtual carrier or identified uplink resources of the second virtual carrier; or the RO does not precede a Synchronization Signal/Physical Broadcast Channel (PBCH) Block (SSB) in a Physical Random Access Channel (PRACH) slot and starts at least a predetermined time period after a last downlink symbol and at least the predetermined time period after a last SSB symbol.

15. The method of claim 1, wherein:

the first uplink resource and the second uplink resource comprise Random Access Channel (RACH) Occasions (ROs), the ROs comprising first ROs and second ROs; and the method further comprises receiving, by the wireless communication device, first configurations for frequency positions and number of Frequency-Domain Multiplexed (FDMed) ROs for the first ROs in the first virtual carrier and second configurations for frequency positions and number of FDMed ROs for the second ROs in the second virtual carrier.

16. The method of claim 1, further comprising:

receiving, by the wireless communication device from the network, at least one first power parameter for the first virtual carrier and at least one second power parameter for the second virtual carrier, wherein the at least one first power parameter and the at least one second power parameter are configured for the first virtual carrier and the second virtual carrier independently; and determining, by the wireless communication device, a first power for sending the uplink access signal on the first uplink resource of the first virtual carrier based on the at least one first power parameter and a power ramping counter; and determining, by the wireless communication device, a second power for sending another uplink access signal on the second another uplink resource of the second virtual carrier based on the at least one second power parameter and the power ramping counter.

17. The method of claim 1, further comprising:

receiving, by the wireless communication device from the network, at least one power parameter for the first virtual carrier and for the second virtual carrier; and determining, by the wireless communication device, a first power for sending the uplink access signal on the first uplink resource of the first virtual carrier based on the at least one power parameter and a first power ramping counter; and determining, by the wireless communication device, a second power for sending another uplink access signal on the second another uplink resource of the second virtual carrier based on the at least one power parameter and a second power ramping counter.

18. A wireless communication method, comprising:

sending, by a network to a wireless communication device, first information for a first virtual carrier, wherein the first information corresponds to configuration information that defines at least one of a first uplink resource or a first downlink resource of the first virtual carrier, wherein second information for a second virtual carrier is determined by the wireless communication device based on the first information, wherein the second information corresponds to configuration information that defines at least one of a second uplink resource or a second downlink resource of the second virtual carrier; and based on the first information and the second information, at least one of:

receiving, by the network from the wireless communication device, an uplink access signal on the first uplink resource of the first virtual carrier or the second uplink resource of the second virtual carrier; or sending, by the network to the wireless communication device, downlink control information on at least one of the first downlink resource in the first virtual carrier or the second downlink resource in the second virtual carrier based on the first information and the second information.

19. A wireless communication device, comprising:

at least one processor configured to:

receive, via a transceiver from a network, first information for a first virtual carrier, wherein the first information corresponds to configuration information that defines at least one of a first uplink resource or a first downlink resource of the first virtual carrier; and determine second information for a second virtual carrier based on the first information, wherein the second information corresponds to configuration information that defines at least one of a second uplink resource or a second downlink resource of the second virtual carrier; and based on the first information and the second information, at least one of:

send, via the transceiver to the network, an uplink access signal on the first uplink resource of the first virtual carrier or the second uplink resource of the second virtual carrier; or receive, via the transceiver from the network, downlink control information on at least one of the first downlink resource in the first virtual carrier or the second downlink resource in the second virtual carrier based on the first information and the second information.

20. A network node, comprising:

at least one processor configured to:

send, via a transceiver to a wireless communication device, first information for a first virtual carrier, wherein the first information corresponds to configuration information that defines at least one of a first uplink resource or a first downlink resource of the first virtual carrier, wherein second information for a second virtual carrier is determined by the wireless communication device based on the first information, wherein the second information corresponds to configuration information that defines at least one of a second uplink resource or a second downlink resource of the second virtual carrier; and based on the first information and the second information, at least one of:

receive, via the transceiver from the wireless communication device, an uplink access signal on the first uplink resource of the first virtual carrier or the second uplink resource of the second virtual carrier; or send, via the transceiver to the wireless communication device, downlink control information on at least one of the first downlink resource in the first virtual carrier or the second downlink resource in the second virtual carrier based on the first information and the second information.

* * * * *